UNITED STATES PATENT OFFICE.

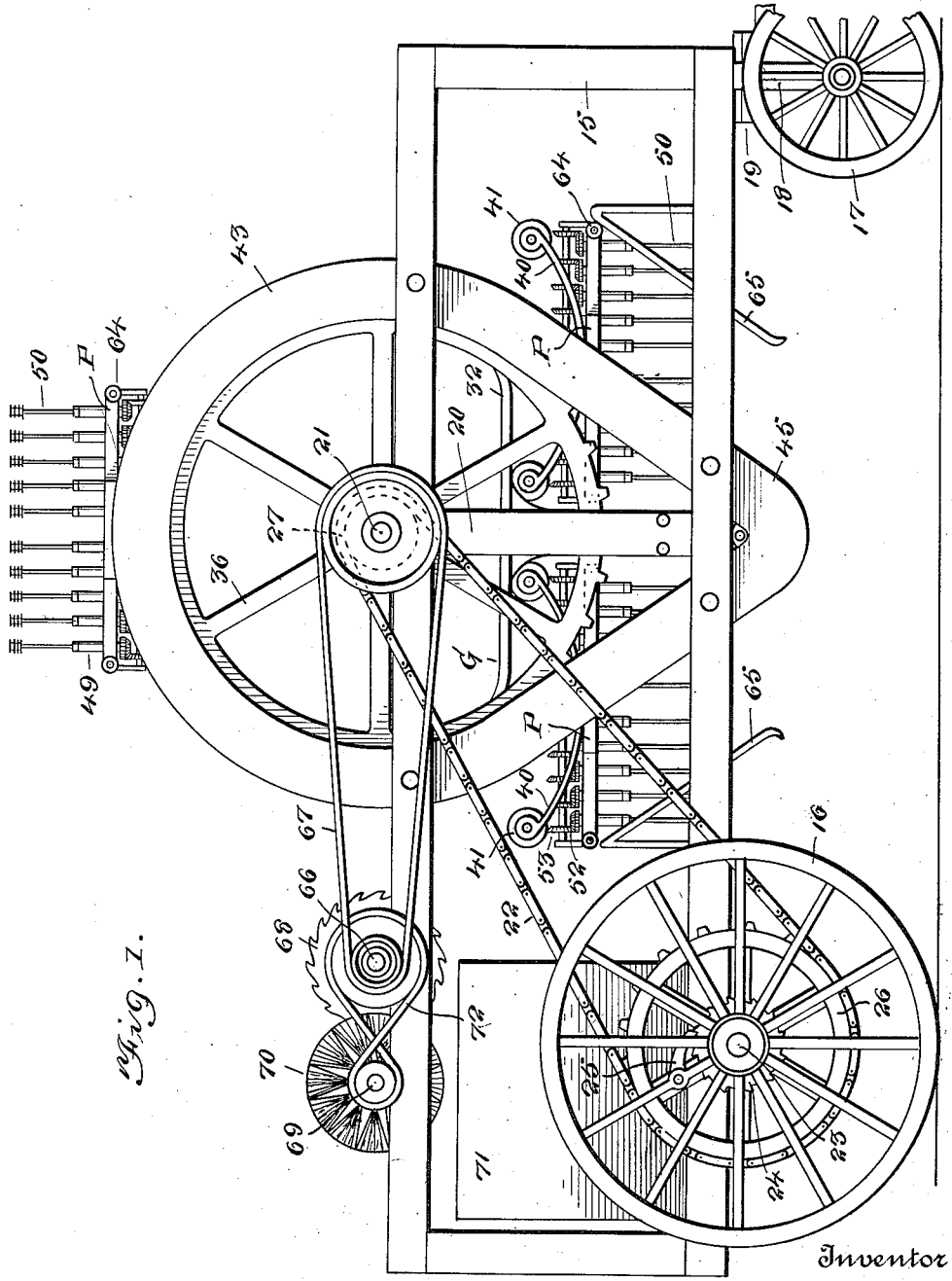

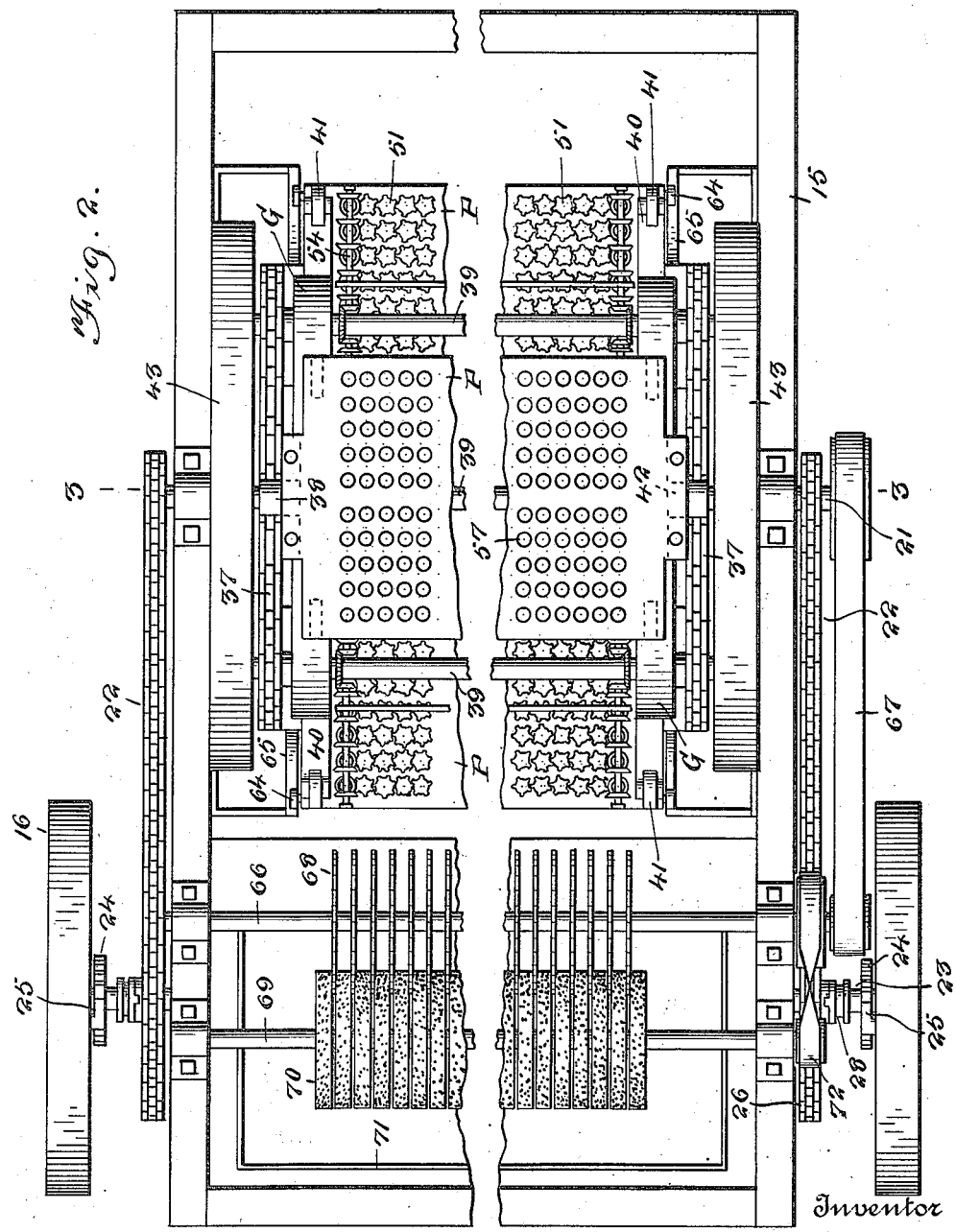

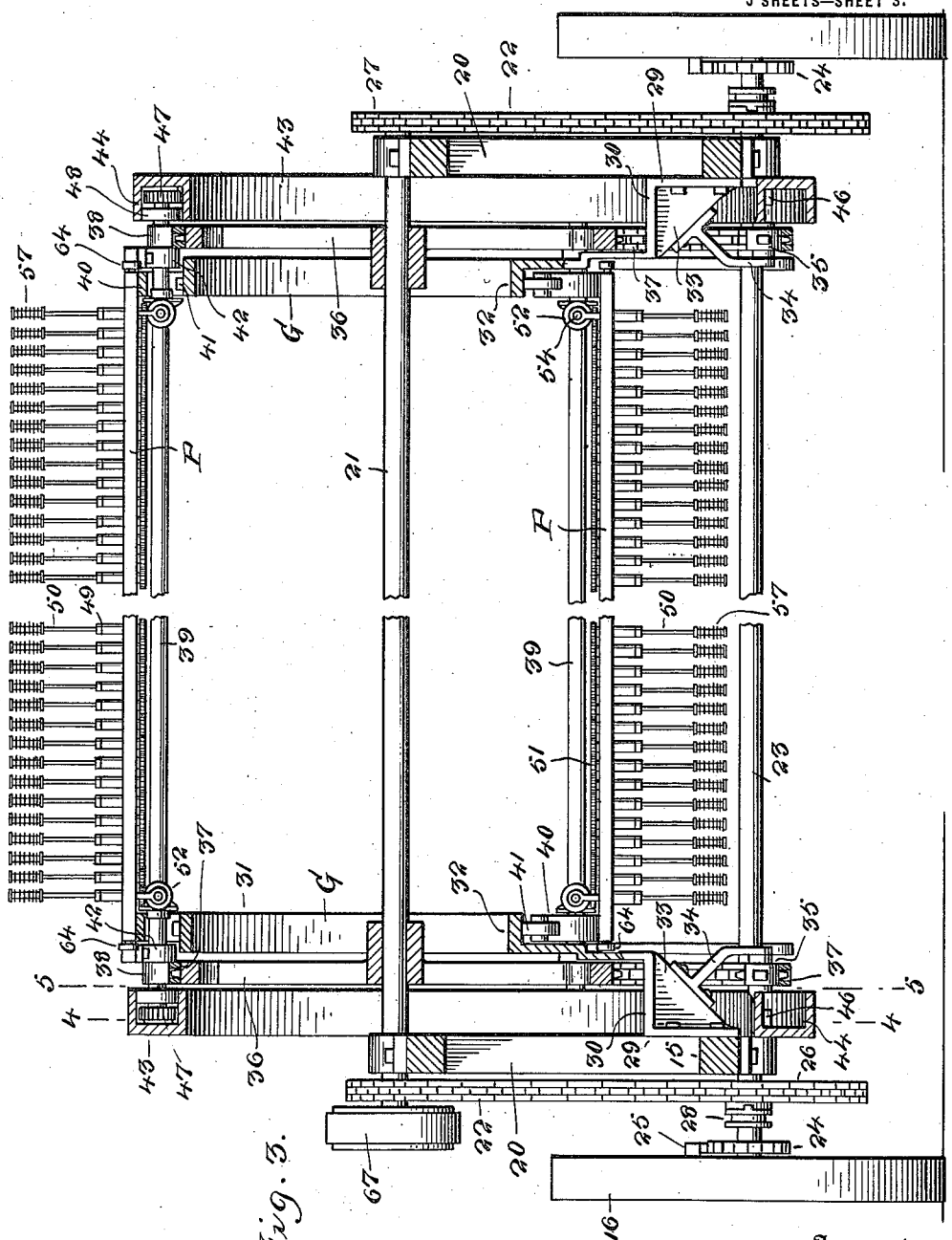

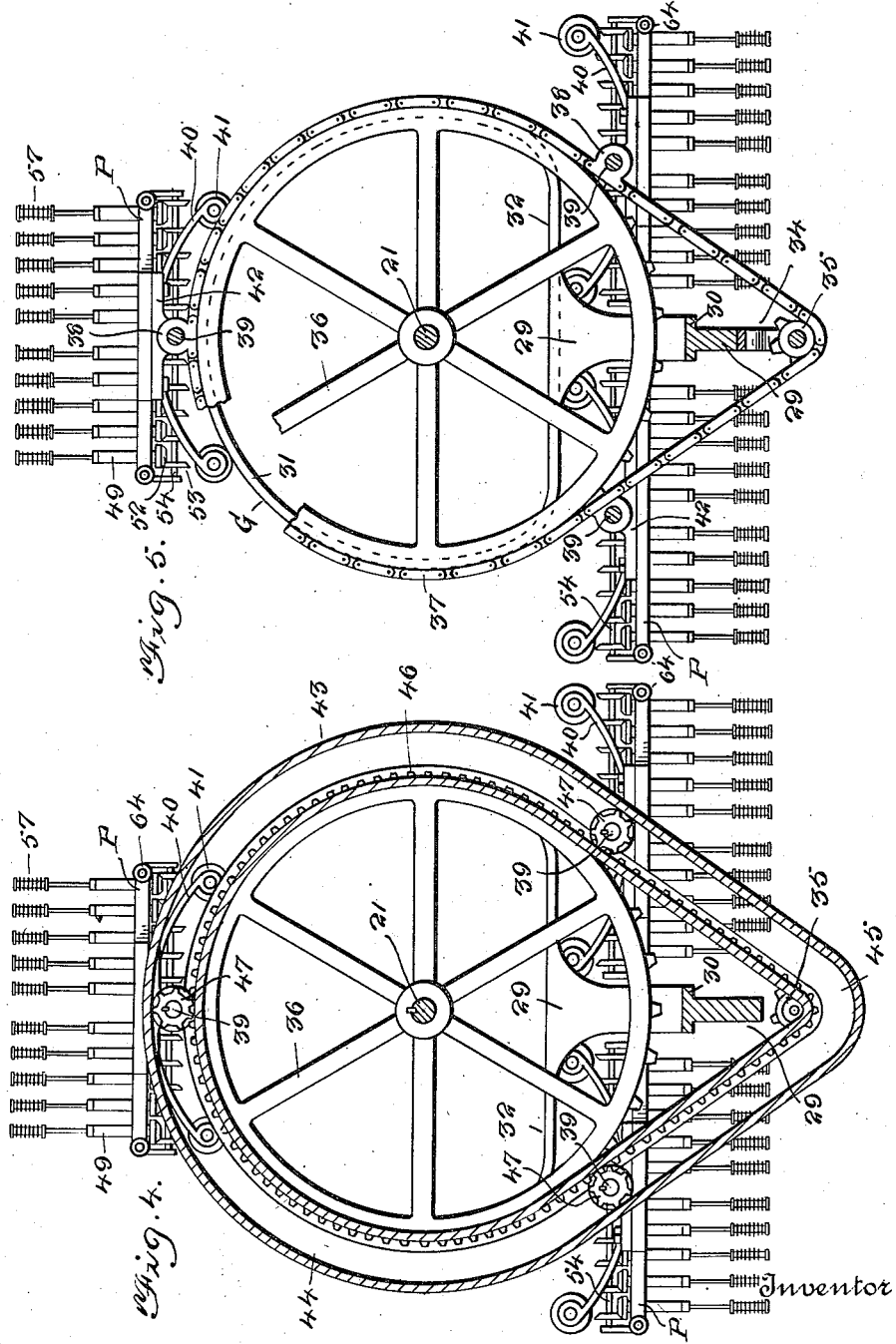

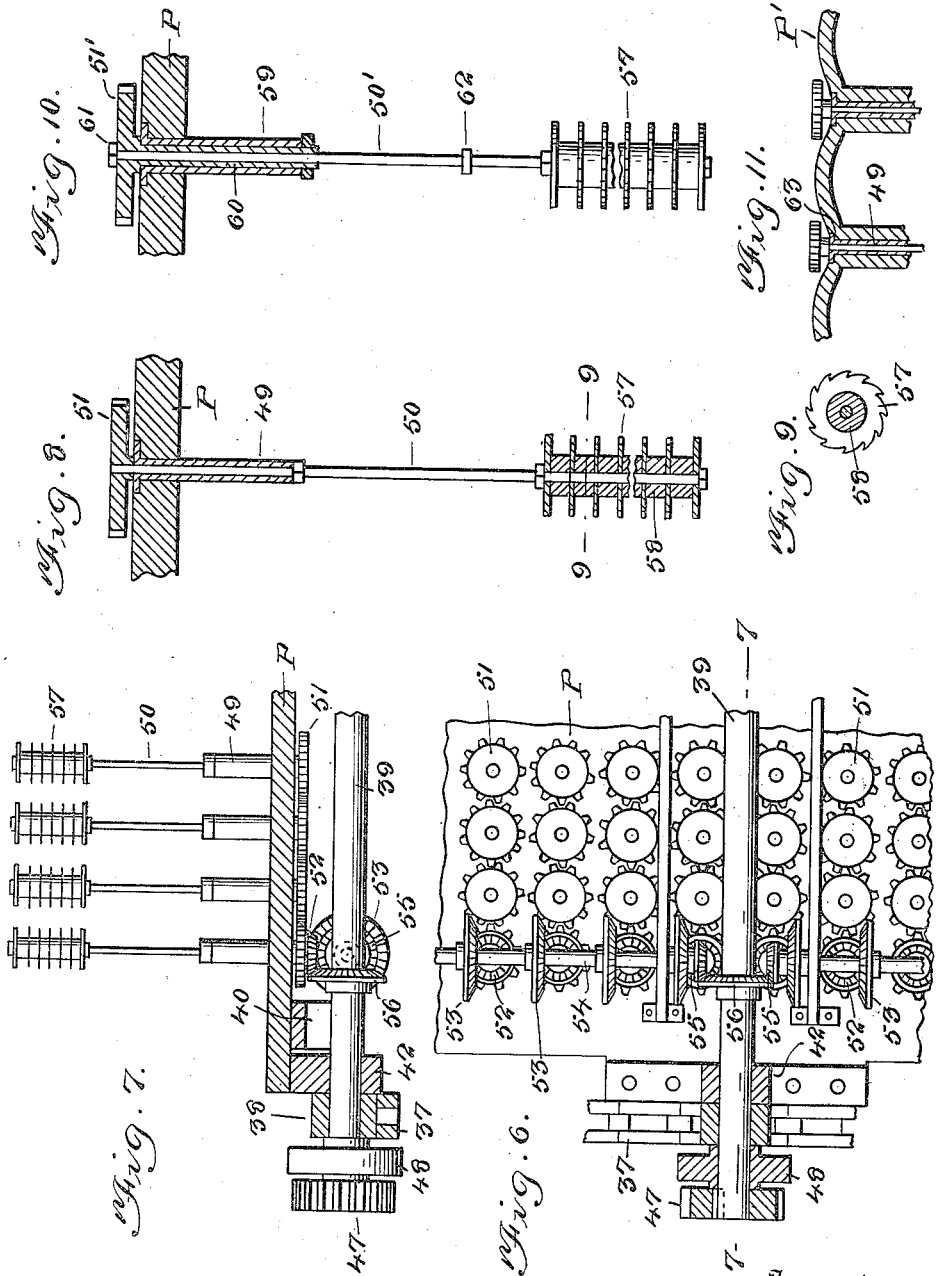

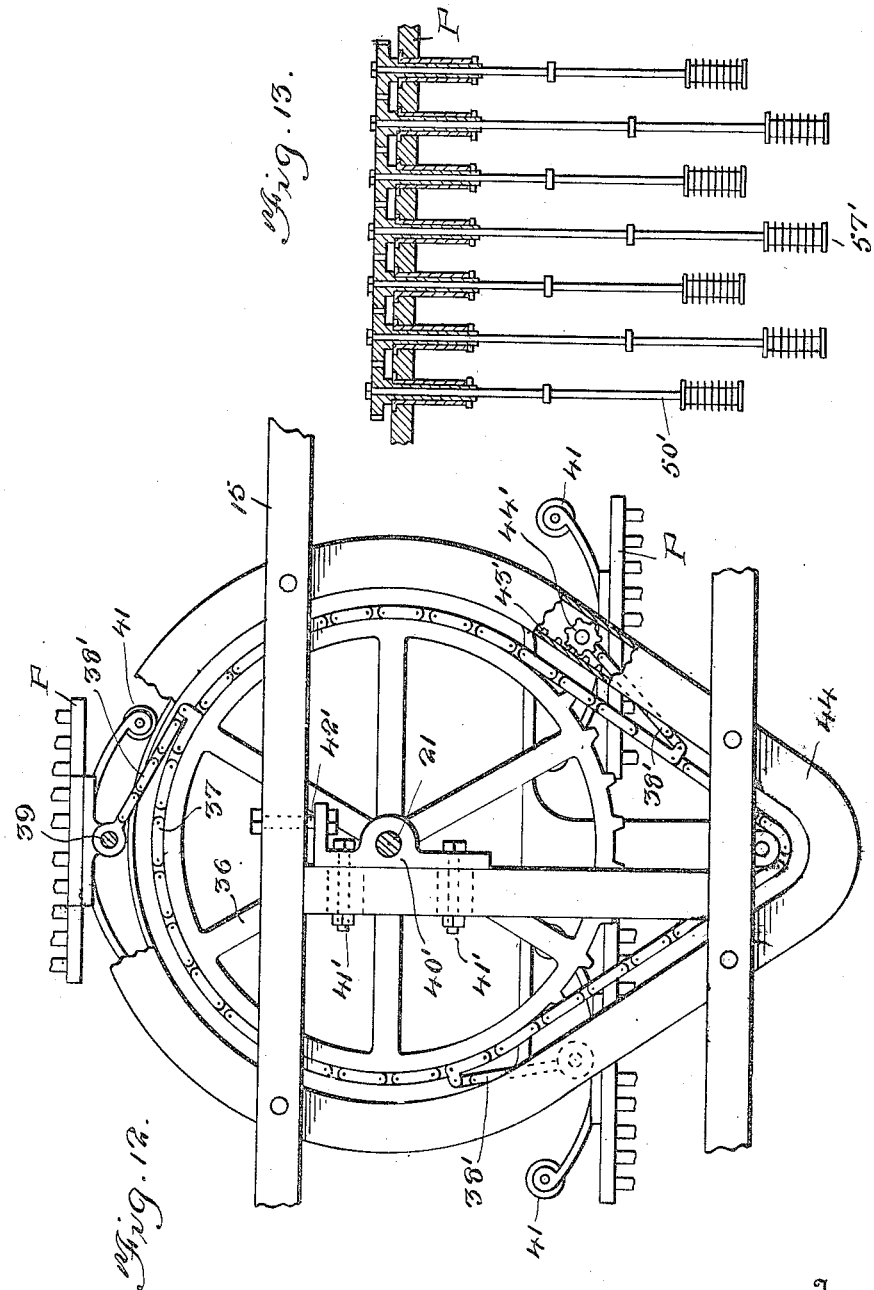

THEOPHILUS E. WALTON, OF WAYCROSS, GEORGIA.

COTTON-PICKING MACHINE.

1,287,532.

Specification of Letters Patent.   Patented Dec. 10, 1918.

Application filed March 30, 1918.   Serial No. 225,741.

*To all whom it may concern:*

Be it known that I, THEOPHILUS E. WALTON, a citizen of the United States, residing at Waycross, in the county of Ware and State of Georgia, have invented new and useful Improvements in Cotton-Picking Machines, of which the following is a specification.

This invention relates to cotton harvesters and it has for its object to produce a machine of simple and improved construction by means of which locks of cotton may be stripped from the plants in a thorough and efficient manner, the machine being provided with a receptacle in which the cotton is deposited.

A further object of the invention is to produce a simple and improved machine comprising a wheel supported carrying frame and a plurality of picker platforms which are supported for orbital movement about a common axis, each of said platforms being equipped with a large number of rotary pickers, and means being provided whereby the platforms will be properly guided and whereby the pickers will be actuated.

A further object of the invention is to simplify and improve the supporting means and actuating means for the picker platforms as well as for the rotary pickers and also to provide means for stripping the cotton from the rotary pickers.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings:—

Figure 1 is a side elevation of a machine constructed in accordance with the invention.

Fig. 2 is a top plan view of the same.

Fig. 3 is a transverse sectional view taken on the line 3—3 in Fig. 2.

Fig. 4 is a sectional detail view taken on the line 4—4 in Fig. 3.

Fig. 5 is a sectional detail view taken on the line 5—5 in Fig. 3.

Fig. 6 is a detail plan view of a portion of one of the picker platforms.

Fig. 7 is a sectional detail view taken on the line 7—7 in Fig. 6.

Fig. 8 is a sectional detail view of one of the rotary pickers.

Fig. 9 is a sectional detail view taken on the line 9—9 in Fig. 8.

Fig. 10 is a sectional detail view illustrating a modified form of one of the rotary pickers.

Fig. 11 is a sectional detail view but taken through a small portion of one of the picker platforms and illustrating a modified construction of said platform.

Fig. 12 is a fragmentary side elevation of a modified form of the harvester with parts broken away and parts in section.

Fig. 13 is a sectional view showing a modified arrangement of the picking elements.

Corresponding parts in the several figures are denoted by like characters of reference.

The frame of the improved machine which is generally designated by 15 is mounted for convenience in transportation on rear wheels 16 and front wheels 17, the latter being carried by a front truck 18 including a fifth wheel 19. The machine may be drawn by horses, by a tractor or by suitable propulsion means installed on the frame. Such means, however, is no part of the invention and the same has not been illustrated.

The frame 15 includes uprights 20, one at each side thereof, said uprights being positioned intermediate the front and rear ends. Adjacent to the upper ends of the uprights 20 bearings are provided for a main driven shaft 21. Chains 22 drive the shaft 21 from the axle 23 which is rotated by said rear wheels through the medium of clutch devices including ratchet wheels 24 and dogs or pawls 25, the axle being equipped with sprocket wheels 26 from which the chains 22 are trained over sprocket wheels 27 on the shaft 21. Clutch means conventionally indicated at 28 are preferably provided in order to enable the transmission of motion to be interrupted at will.

Securely bolted on the frame and particularly on the uprights 20, at the lower ends of the latter, are standards or arms 29 each having an inwardly extending offset 30, said arms or standards serving to support the vertically disposed cam shaped guide members G, one adjacent to each side of the frame. Each of the cam shaped guide members includes an upper arcuate portion 31 which is concentric with the main shaft 21 and a lower horizontal portion 32 which is disposed below the shaft 21, the arcuate portion 31 extending through approximately 270° of a circle, as best seen in Figs. 4 and 5. Each of the arms or standards 29 is provided adjacent to the offset 30 with a web 33 on which a bracket 34 is bolted or otherwise secured, each of said brackets serving to support a small sprocket wheel 35 which is mounted for rotation thereon.

The shaft 21 carries sprocket wheels 36 located adjacent to the outer faces of the cam members G, each of said sprocket wheels being of a radius equal to the radius of the arcuate portion of the cam members. Heavy chains 37 are trained over the sprocket wheels 36 and 35, the parts being so proportioned and arranged that the said chains will substantially follow the contour of the arcuate portion of the cam member G, at each side of the frame.

Some of the links of the chains 37 are constructed to afford bearings 38 in which shafts 39 are supported for rotation, said shafts being disposed transversely of the frame of the machine. In the drawing three such shafts have been shown, said shafts being equidistantly disposed around the circumference of the chain, and each of said shafts supports a picker platform P which is rockingly mounted thereon. Connected with each picker platform are curved leaf springs 40 each of said springs carrying guide rollers 41 that engage and travel on the cam shaped tracks or guides G. The respective platforms P are provided with bearings 42 whereby they are rockingly mounted or supported on the shafts 39.

Securely mounted on the side portions of the frame structure on the inner faces thereof are channel shaped housings 43, one at each side from the grooves or channels 44 of said housings facing inwardly as very clearly seen in Fig. 3. The housings are of ovate contour, the upper arcuate portion thereof being concentric with the shaft 21 and their lower convergent portions terminating in apices 45 adjacent to the sprocket wheels 35. The walls of the channels which are innermost with respect to the shaft 21 are provided with teeth or sprockets 46 engaged by pinions 47 carried by the shafts 39 which latter will thus be rotated as they make the circuit of the channel shaped housings. Said shafts are also equipped with guide rollers 48 that engage and travel on the smooth portions of the walls of the housings thereby serving to insure stability in operation and to avoid undue vibration.

Each of the platforms P is provided with a large number of bearing sleeves 49 wherein the spindles 50 of the rotary pickers are mounted for rotation. The picker spindles on each platform are arranged in rows, transversely with respect to the frame of the machine, and the spindles of each row are provided with intermeshing gears 51, clearly seen in Fig. 6 for the intercommunication of rotary motion between said spindles. The spindles adjacent to the side edges of the respective platforms are also provided with bevel gears 52 meshing with bevel gears 53 carried by shafts 54, said shafts being also provided with bevel gears 55 meshing with bevel gears 56 on the shafts 9. When the machine is in operation, the shafts 39 will be rotated by the pinions 47 meshing with the teeth 46, and it follows that rotary motion will be transmitted to all of the spindles of the rotary pickers. The spindles, it will be observed, extend or radiate outwardly with respect to the main driven shaft 21 and said spindles are provided adjacent to their outer ends with saw toothed disks 57, said disks being supported in spaced relation by means of spacing members 58. The disks or picker saws 57 are obviously of small dimensions and the teeth of said disks are pointed in the direction in which they are rotated so that the cotton locks will be engaged thereby and stripped from the plants. It will be observed that, due to the means for the transmission of motion herein described, alternate spindles of each row will be rotated in opposite directions, thus causing the cotton locks to be effectively engaged by the stripping saws.

It may be found desirable to support the spindles of the rotary pickers with freedom for movement longitudinally in order that the said rotary pickers may yield when coming in engagement with the plants. For this purpose the construction illustrated in Fig. 10 may be employed, said construction embodying a supporting sleeve 59 connected with and carried by the platform P, said sleeve affording a bearing for a hub 60 carrying the spur wheel which is here designated by 51'. The hub 60 has a bore of non-circular cross section for the reception of the picker spindle 50' which is longitudinally slidable, said spindle being provided with limiting stops 61, 62. The rotary picker spindles 50' carrying the saws 57 will gravitate in plant engaging direction at the proper time during the operation of the machine, but will be free to yield upwardly with respect to the plants as will be readily understood.

In view of the large number of bearings which it is necessary to provide for the rotary picker members of each platform, I may find it desirable to adopt a peculiar construction illustrated in Fig. 11 of the drawings whereby I will be enabled to apply oil or other lubricant to the spindle bearings in a rapid and effective manner. By this modification the platform here designated by P' is grooved or corrugated, the bearing sleeves 49 being arranged in the bottom portions of the respective grooves or channels. When lubricating oil is poured into the respective channels, designated by 63, such oil will find its way to each of the bearing sleeves located in the respective grooves or channels, and operation of lubricating the spindle bearings may thus be quickly and effectively performed.

Each picker platform is provided adjacent to the corners thereof with guide rollers 64 for engagement with which trackways 65 are provided, said trackways being mounted or supported in the frame of the machine in spaced and parallel relation to the lower convergent portions of the housings 43, the purpose of said trackways being to prevent undue swinging or tilting movement of the picker platforms as long as the latter are in engagement with the plants from which the cotton is to be stripped.

The frame of the machine supports at a suitable distance from the rear end thereof a transverse shaft 66 which receives motion from the main shaft 21 through the medium of a belt or band 67. The shaft 66 carries saws 68 which are arranged to operate in the spaces between the rotary pickers of the respective platforms for the purpose of removing from said pickers the cotton which has been stripped from the plants by said pickers. Another shaft 69 which is supported for rotation in parallel and spaced relation to the shaft 66 carries a brush or brushes 70 whereby the cotton is removed from the saws and conveyed to a receptacle 71. The brush carrying shaft 69 is driven by means of a belt 72 from the shaft 66. It may be hereby mentioned that no limitation is made to the particular means herein shown for the purpose of removing the cotton from the rotary strippers; any convenient device whereby the operation will be satisfactorily performed may be substituted when desired.

The improved machine may be built in any desired dimensions to straddle one or more rows of plants. When a machine travels along the row the main shaft 21 will be rotated, thereby driving the chains 37 and causing the picker platforms to be moved orbitally around the shaft 21 in the course in which the chains are trained. While the wheels 41 carried by the springs 40 associated with the respective platforms are in engagement with the arcuate portions 31 of the respective guides G, rocking movement of the platforms will be prevented except to a limited extent permitted by the springs 40. The transmission is so arranged that the picker platforms carried by the forward leads of the chains 37 will move downwardly. As each platform approaches the lower limit of its movement the wheels 41 carried by the lower ends of the springs 40 will engage the flat horizontal portions 32 of the cam shaped guides or tracks G, and the wheels at the upper ends of the springs will leave the tracks, permitting the platform to rock or swing to an approximately horizontal position indicated in Figs. 4 and 5. As the downward movement of the platform continues the rollers 64 at the front edge of the platform will engage the tracks 65 whereby the platform will be guided downwardly with freedom for rocking in one direction only. The rotary picker spindles will pass in engagement with the plants at about this point and, due to the forward movement of the vehicle as well as to the orbital movement of the platform, the latter, except for its vertical movement, will be substantially stationary with respect to the plant or plants engaged thereby until it passes around the apices 45 of the housings 43 and thence upwardly until the rollers 64 at the rearward corners of the platform engage the rearwardly disposed track members 65. The platform now moves upwardly until the wheels 41 at the forward ends of the springs 40 engage the horizontal portion 32 of the cam shaped track G, causing the platform to be gradually tilted until the wheels 41 at the rearward ends of the springs 40 engage the arcuate portions 31 of the tracks G. The spindles of the rotary pickers will now pass between the saws 68 which remove the cotton from the stripping saws 57 carried by the rotary spindles, the cotton being eventually deposited in the receptacle 71.

It will be seen that for a considerable period the plants will be engaged by the rotary strippers carried by two platforms, said platforms being supported in such a manner as to be free to rock, thereby causing the stripping saws of the rotary spindles to surge out the cotton locks and to strip the same effectively from the plants.

The general construction of the machine is simple, and its operation will be found thoroughly effective for the purposes for which it is provided.

In the form of the invention as illustrated in Figs. 12 and 13 of the drawings slight modifications are made to permit of the adjustment of the wheel 36 to compensate for wear or slack which may take place in the chain 37. In this form of the invention the bearings 38 as shown in Fig. 5 are dispensed with and in lieu thereof the shafts 39 are connected with the chain 37 by means of relatively short chains 38'. Therefore the axes of the shafts 39 are not positively fixed with relation to the chains 37 consequently the wheels 36 may be adjusted to take up any wear which might occur in the chain 37. The bearings 40' are adjustably mounted upon the frame of the machine and may be secured at adjusted position by means of bolts 41' which pass through slots in the vertical standards of the frame of the machine. A bolt 42' passes through the upper horizontal rail of the frame of the machine and also through the upper portion of the bearing 40' and may be used in a usual manner for shifting the bearing 40' along the vertical standard of the frame of the machine. Therefore the bearings 40' may be raised or lowered and consequently the chains 37 may be maintained in proper stretched condition around the peripheries of the wheels 36.

As illustrated in Fig. 13 of the drawing the shafts 50' are of different lengths ecah alternate shaft is relatively long and the intervening shafts are relatively short and the said shafts carry gangs of saws 57' positioned at the lower ends of the shafts and the said saws are consequently located at different elevations. Therefore the said saws may more readily enter betwen the branches of the plants and remove the cotton from the same.

What is claimed as new is:

1. In a machine of the class described, a wheel supported carrying frame, a transverse shaft deriving motion from the carrying wheels, sprocket wheels on the shaft, idlers below the shaft and chains trained over the sprocket wheels and idlers, in combination with rockably supported picker platforms carried by the chains for orbital movement about the axis of the driven shaft, and means for guiding the platforms and for controlling the rocking movement thereof, said means including springs mounted on the respective platforms and having terminal wheels, cam shaped tracks for said wheels and pickers carried by the platforms.

2. In a machine of the class described, a wheel supported carrying frame, a transverse shaft deriving motion from the carrying wheels, sprocket wheels on the shaft, idlers below the shaft and chains trained over the sprocket wheels and idlers, in combination with rockably supported picker platforms carried by the chains for orbital movement about the axis of the driven shaft, and means for guiding the platforms and for controlling the rocking movement thereof, said means including springs mounted on the respective platforms and having terminal wheels, and cam shaped tracks for said wheels, said tracks having arcuate upper portions concentric with the main driven shaft and flat horizontally disposed lower portions whereby at a predetermined point in the orbit each platform will be free to swing to an approximately horizontal position and pickers carried by the platforms.

3. In a machine of the class described, a portable carrying frame, a transversely disposed driven shaft having large sprocket wheels, small idlers supported below the shaft, chains trained over the sprocket wheels and idlers, said chains having downwardly convergent front and rear leads, shafts carried by the chains, picker platforms rockably supported on the shafts, gear wheels carried by the shafts, cam shaped channeled tracks for the gear wheels, and having internal racks with which the gear wheels mesh; the shafts carrying the picker platforms being further provided with guide wheels engaging the channels.

4. In a machine of the class described, a portable carrying frame, a transverse driven shaft, a picker platform rockably supported for orbital movement about the axis of the driven shaft, driven rotary spindles carried by the picker platform and equipped with stripping saws and means for moving the platform and for driving the spindles by power derived from the main driven shaft, said picker spindles being supported for free movement in the direction of the length thereof.

5. A machine of the class described comprising a frame, a shaft journaled thereon, means for securing the shaft at an adjusted position, means for rotating the shaft, wheels mounted upon the shaft, chains trained around said wheels, idlers around which the chains are trained, channel members surrounding the wheels and provided with teeth, chain sections connected with the first mentioned chains, shafts connected with the chain sections, sprocket wheels mounted on the shafts and adapted to engage the teeth in the channel members and cotton picking mechanisms operatively connected with the last mentioned shafts.

6. A machine of the character described a supporting frame, cotton picking mechanisms mounted for movement thereon, said mechanisms including shafts, means for rotating said shafts, each alternate shaft being relatively long and the other shafts relatively short and gangs of picking saws carried at the ends of said shafts.

In testimony whereof I affix my signature.

THEOPHILUS E. WALTON.